M. A. ENGER.
PACKING GLAND.
APPLICATION FILED MAY 18, 1916.
1,256,780. Patented Feb. 19, 1918.
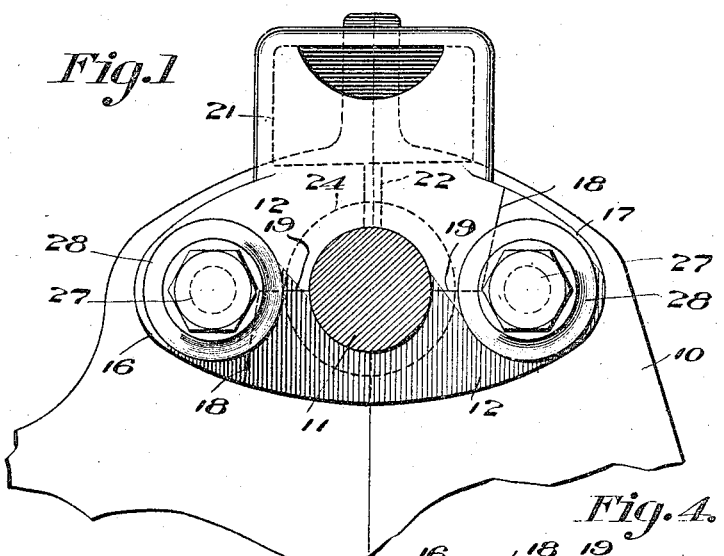
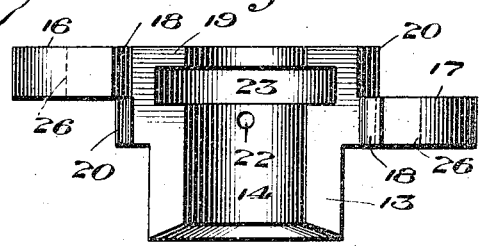
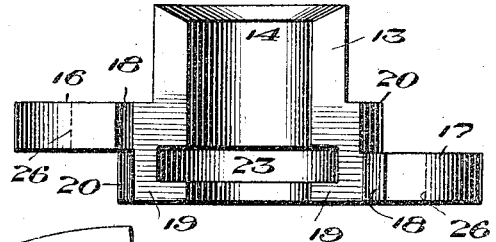
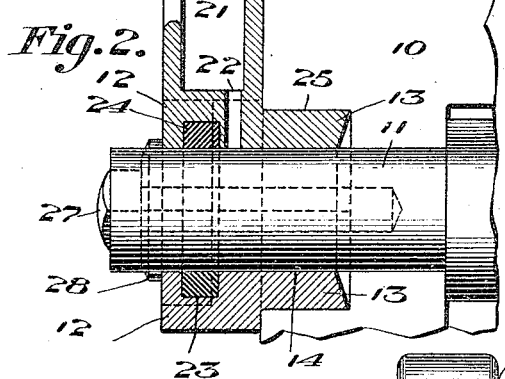
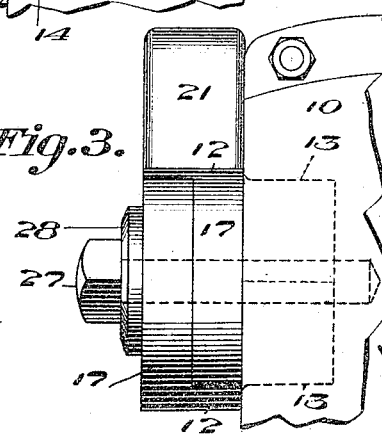
Witnesses
Inventor
Martin A. Enger

UNITED STATES PATENT OFFICE.

MARTIN A. ENGER, OF WILLMAR, MINNESOTA, ASSIGNOR OF ONE-HALF TO RUSSELL SPICER, OF WILLMAR, MINNESOTA.

PACKING-GLAND.

1,256,780.

Specification of Letters Patent.

Patented Feb. 19, 1918.

Application filed May 18, 1916. Serial No. 98,346.

*To all whom it may concern:*

Be it known that I, MARTIN A. ENGER, a citizen of the United States, residing at Willmar, in the county of Kandiyohi and State of Minnesota, have invented new and useful Improvements in Packing-Glands, of which the following is a specification.

This invention relates to packing glands and has as its object to provide a packing gland which may be readily placed in position upon and removed from a shaft or rod without disconnecting the shaft or rod from its position, or otherwise disturbing the same. My improved packing gland consists of but two parts which may be readily assembled and easily secured in place about the shaft to which it is to be attached, and after the gland is in position, the parts due to the fact that they interlock are securely held against relative displacement. The improved packing gland is provided with an oil box so that a supply of oil is at all times had, which oil is gradually fed to the bearing surface of the gland to maintain the shaft in a properly lubricated condition, and the gland has means for preventing dust and dirt from gaining access to the shaft and the oil from leaking from the packing gland.

The above and other objects of my invention are obtained by the structure described in the following specification and illustrated in the accompanying drawings, and wherein—

Figure 1 is a front elevational view of my improved packing gland as applied to a shaft mounted in a casing.

Fig. 2 is a vertical section view taken longitudinally through the structure shown in Fig. 1.

Fig. 3 is an edge view of my packing gland as applied to the shaft and casing.

Figs. 4 and 5 are inside views of the respective parts of which my improved packing gland is comprised.

Referring to the drawings wherein like numerals represent like parts in the several views, 10 designates a casing which may be of any suitable type, and in which is mounted a transverse shaft 11 having its ends extending outwardly beyond the ends of the casing, as shown in Fig. 2. It is, of course, understood that the casing herein shown is by way of illustration only as my packing gland may be attached to any type of shaft supporting member and while I have shown the shaft extending horizontally it may, of course, be inclined or located in a vertical plane.

My improved packing gland consists of two parts which are very similar in structure being in fact substantially counterparts of each other. Each of the parts has a plate or flange portion 12, and a cylindrical neck portion 13 extending at right angles from the plate or flange and these portions are provided with a groove 14 semi-circular in cross-section to form a bearing for the shaft to which it is to be attached. The flange portion 12 is somewhat elongated and is recessed or cut-away at one side intermediate its ends to provide two ears 16 and 17. The inner or opposed edges 18 of the ears are inclined inwardly toward each other, and between the inner edges of the inclined portions 18 and the bearing surface 14 are shoulders 19. The ears of the plate or flange portion of the gland parts are of less thickness than the main portion of the plate, and preferably they are substantially one half the thickness thereof. The ears 16 and 17 are offset from each other or placed in staggered relation as will be seen from Figs. 4 and 5. The plate portion 12 adjacent the ears is provided with surfaces 20 which are inclined from the shoulders 19 outwardly from each other, that is, in a direction opposite to the inclined portions 18 of the ears, and the angle inclination of the surfaces 20 from a vertical line is substantially that of the surfaces 18.

My improved packing gland is provided with an oil box and preferably the upper member of the packing gland has integral therewith a chamber 21, which is adapted to receive a suitable lubricating oil, and, if desired, an absorbent, thoroughly saturated with oil may be placed within the chamber 2, to permit the oil to leak slowly through a port 22 leading from the oil box to the bearing surface 14. Each of the gland parts as will be seen from Figs. 2, 4, and 5 have an internal oil groove 23 in its bearing surface 14 which receives a washer or filter 24 thoroughly saturated with oil for supplying oil to the shaft at all times. The washer or filter 24 prevents oil from seeping outwardly toward the end of the shaft and prevents dust and the like from gaining access to the bearing surface of the packing gland.

When it is desired to attach my improved packing gland to a shaft, one of the gland parts is placed with its bearing surface 14 engaging the shaft, and the other member is then brought into alinement with the first gland part, and the two parts are moved relatively to each other until the shoulders 20 of the two parts engage. In this position, the inclined surfaces 18 of the ears of one member or part engage the inclined surfaces 20 of the body portion of the other member. Due to the inclination of the surfaces 18 and 20, relative lateral displacement of the two parts of which my improved packing gland is comprised, when the same are assembled, is prevented, the parts being more or less wedged together. After the parts are so assembled, they are moved longitudinally of the shaft toward the casing until the neck portions 13 of the gland engage in the recess 25 of the bearing or casing. The ears 16 and 17 are apertured as at 26 so as to receive a bolt 27 which is adapted to be screwed into a threaded hole in the end of the bearing or casing, and, if desired, a washer 28 may be inserted between the head of the bolt and the packing gland.

While I have shown a particular construction, it will be understood that variations in mechanical details may be made without departing from the spirit of my invention, and I do not, therefore, limit myself to the exact details shown and described, except in so far as I am limited by the terms of the appended claims.

What is claimed as new is:—

1. A packing gland comprising two parts, each part having a pair of offset ears, the opposed surfaces on said ears being inclined inwardly toward each other, surfaces adjacent said ears inclined outwardly from each other, the inclined surfaces on the ears of one member being adapted to engage the inclined surfaces adjacent the ears of the other member.

2. A packing gland composed of two parts, each part comprising a flange portion and a neck portion having a bearing surface, said flange portion being cut-away intermediate its end to provide a pair of ears which are offset from each other, the opposed surfaces of said ears being inclined toward each other, and surfaces on said flange portions adjacent said ears inclined outwardly from each other, the ears on corresponding ends of the two parts when assembled being adapted to engage on opposite sides of each other with the inclined surfaces of the ears engaging the inclined surfaces adjacent the ears.

3. A packing gland consisting of two parts, each part having two ears in staggered or offset relation, opposed surfaces on said ears inclined toward each other, inclined surfaces adjacent said ears inclined from each other, the inclined surfaces on the ears of one part being adapted to engage the inclined surfaces adjacent the ears of the other part, a groove in the bearing surfaces of said members, and an oil box in one of the parts.

In testimony whereof I have hereunto set my hand in presence of two subscribing witnesses.

MARTIN A. ENGER.

Witnesses:
A. A. ANDERSON,
JOHN A. BODUM.

Copies of this patent may be obtained for five cents each, by addressing the "Commissioner of Patents, Washington, D. C."